United States Patent
Tomasso et al.

(10) Patent No.: US 11,068,600 B2
(45) Date of Patent: Jul. 20, 2021

(54) APPARATUS AND METHOD FOR SECURE ROUTER WITH LAYERED ENCRYPTION

(71) Applicant: KCT HOLDINGS, LLC, Turnersville, NJ (US)

(72) Inventors: Keiron Christopher Tomasso, Turnersville, NJ (US); Derek Yerger, Turnersville, NJ (US)

(73) Assignee: KCT HOLDINGS, LLC, Turnersville, NJ (US)

( * ) Notice: Subject to any disclaimer, the term of this patent is extended or adjusted under 35 U.S.C. 154(b) by 77 days.

(21) Appl. No.: 16/418,582

(22) Filed: May 21, 2019

(65) Prior Publication Data

US 2019/0354685 A1  Nov. 21, 2019

Related U.S. Application Data

(60) Provisional application No. 62/674,372, filed on May 21, 2018.

(51) Int. Cl.

| G06F 21/57 | (2013.01) |
|---|---|
| G06F 9/4401 | (2018.01) |
| G06F 21/44 | (2013.01) |
| G06F 21/60 | (2013.01) |
| H04W 88/14 | (2009.01) |
| H04W 12/06 | (2021.01) |
| H04W 12/03 | (2021.01) |
| H04W 12/71 | (2021.01) |

(52) U.S. Cl.
CPC .......... *G06F 21/575* (2013.01); *G06F 9/4416* (2013.01); *G06F 21/44* (2013.01); *G06F 21/602* (2013.01); *H04W 12/03* (2021.01); *H04W 12/06* (2013.01); *H04W 12/71* (2021.01); *H04W 88/14* (2013.01)

(58) Field of Classification Search
CPC ...... G06F 21/575; G06F 9/4416; G06F 21/44; G06F 21/602; H04W 12/001; H04W 12/00512; H04W 12/06
See application file for complete search history.

(56) References Cited

U.S. PATENT DOCUMENTS

| 8,296,561 | B2* | 10/2012 | Kanemura | G06F 21/57 |
|---|---|---|---|---|
| | | | | 713/155 |
| 8,307,205 | B2* | 11/2012 | Cha | H04W 12/06 |
| | | | | 713/166 |
| 8,458,801 | B2* | 6/2013 | Furusawa | G06F 21/575 |
| | | | | 726/26 |
| 8,489,888 | B2* | 7/2013 | Lim | G06F 21/71 |
| | | | | 713/182 |
| 8,528,071 | B1* | 9/2013 | Kwan | H04L 63/0876 |
| | | | | 726/14 |

(Continued)

*Primary Examiner* — Tongoc Tran
(74) *Attorney, Agent, or Firm* — Volpe Koenig (57) ABSTRACT

A system, method, and apparatus for secure router operation and initialization. A router may require at least two sets of credentials at different phases of initialization, thereby adhering to a multi-layered security approach. In a first phase of a router initializing for operation, a boot loader of the router may require a first authentication in order to unlock the full-disk encryption and commence booting into firmware. In a second phase, the firmware of the router may require second authentication to continue the initialization and to unlock the file-based encryption and access the settings of the router, after which the router may be fully operational.

10 Claims, 7 Drawing Sheets

(56) References Cited

U.S. PATENT DOCUMENTS

| | | | | |
|---|---|---|---|---|
| 8,528,108 B2* | 9/2013 | Ammer | G06F 21/575 726/30 |
| 8,984,302 B2* | 3/2015 | Isozaki | G06F 12/1433 713/193 |
| 9,246,690 B1* | 1/2016 | Roth | H04L 9/3268 |
| 9,282,460 B2* | 3/2016 | Souissi | H04W 12/06 |
| 9,589,139 B2* | 3/2017 | Bobzin | G06F 15/177 |
| 9,935,766 B2* | 4/2018 | Oyama | G06F 21/575 |
| 9,971,895 B2* | 5/2018 | Rhee | G06F 21/575 |
| 2003/0101338 A1* | 5/2003 | Mullen | H04L 63/0236 713/152 |
| 2004/0025010 A1* | 2/2004 | Azema | G06F 21/57 713/156 |
| 2006/0137005 A1* | 6/2006 | Park | H04L 29/12839 726/21 |
| 2007/0220252 A1* | 9/2007 | Sinko | H04L 63/101 713/168 |
| 2008/0045342 A1* | 2/2008 | Crowder, Jr. | G06F 21/575 463/42 |
| 2010/0017587 A1* | 1/2010 | Wiginton | G06F 21/575 713/1 |
| 2010/0185845 A1* | 7/2010 | Takayama | G06F 21/575 713/2 |
| 2011/0107436 A1* | 5/2011 | Cholas | H04L 63/10 726/29 |
| 2012/0151223 A1* | 6/2012 | Conde Marques | G06F 21/6218 713/193 |
| 2014/0250291 A1* | 9/2014 | Adams | G06F 21/575 713/2 |
| 2015/0019850 A1* | 1/2015 | Rivera | G06F 21/572 713/1 |
| 2016/0232356 A1* | 8/2016 | Barkelew | H04L 9/3268 |
| 2017/0187703 A1* | 6/2017 | Enrique Salpico | H04L 63/1458 |
| 2019/0324764 A1* | 10/2019 | Zhang | G06F 9/4416 |

* cited by examiner

APPARATUS AND METHOD FOR SECURE ROUTER WITH LAYERED ENCRYPTION

CROSS-REFERENCE TO RELATED APPLICATIONS

This application claims the benefit of U.S. Provisional Application No. 62/674,372, filed May 21, 2018, the contents of which are incorporated herein by reference.

FIELD OF INVENTION

The present application is directed to networking and electronic secure communication using a router.

BACKGROUND

The concept of a router has been employed in some of the first known versions of computer networking. Routers relate to intelligent decision-making for deciding where packets should be sent based on a specified protocol. A router is typically connected to a network, such as the internet or a local area network. A need may arise for a multi-function router device that provides functionality beyond what is currently available, specifically, a router that has added security benefits.

SUMMARY

A system, method, and apparatus for secure router operation and initialization. A router may require at least two sets of credentials at different phases of initialization, thereby adhering to a multi-layered security approach. In a first phase of a router initializing for operation, a boot loader of the router may require a first authentication in order to unlock the full-disk encryption and commence booting into firmware. In a second phase, the firmware of the router may require second authentication to continue the initialization and to unlock the file-based encryption and access the settings of the router, after which the router may be fully operational.

DETAILED DESCRIPTION OF THE PREFERRED EMBODIMENT(S)

The present application is written with various examples, embodiments, scenarios, and situations that are meant to present non-limiting exemplary descriptions. Further, it is envisioned that any of the examples, embodiments, scenarios, or situations may be used separately or in combination.

Internet Protocol (IP) routers interfaced with classified IP networks, in National Defense scenarios, may be configured using certificates and settings; all of which cause the device to be considered classified. For this reason, physical security and protection of the device is of utmost importance, especially while transporting or using the device in adversarial, high risk, environments.

Encryption may be used to secure the data contained on such a device to protect the potentially classified or sensitive information on it. There may be a need for a firmware configuration encryption mechanism enabling an end user to secure a device running a router operating system that utilizes a multi-layer approach. As discussed herein, each security layer may occur during a phase, for example a first security layer may relate to a first phase, and a second security layer may relate to a second phase.

Figure 1A:
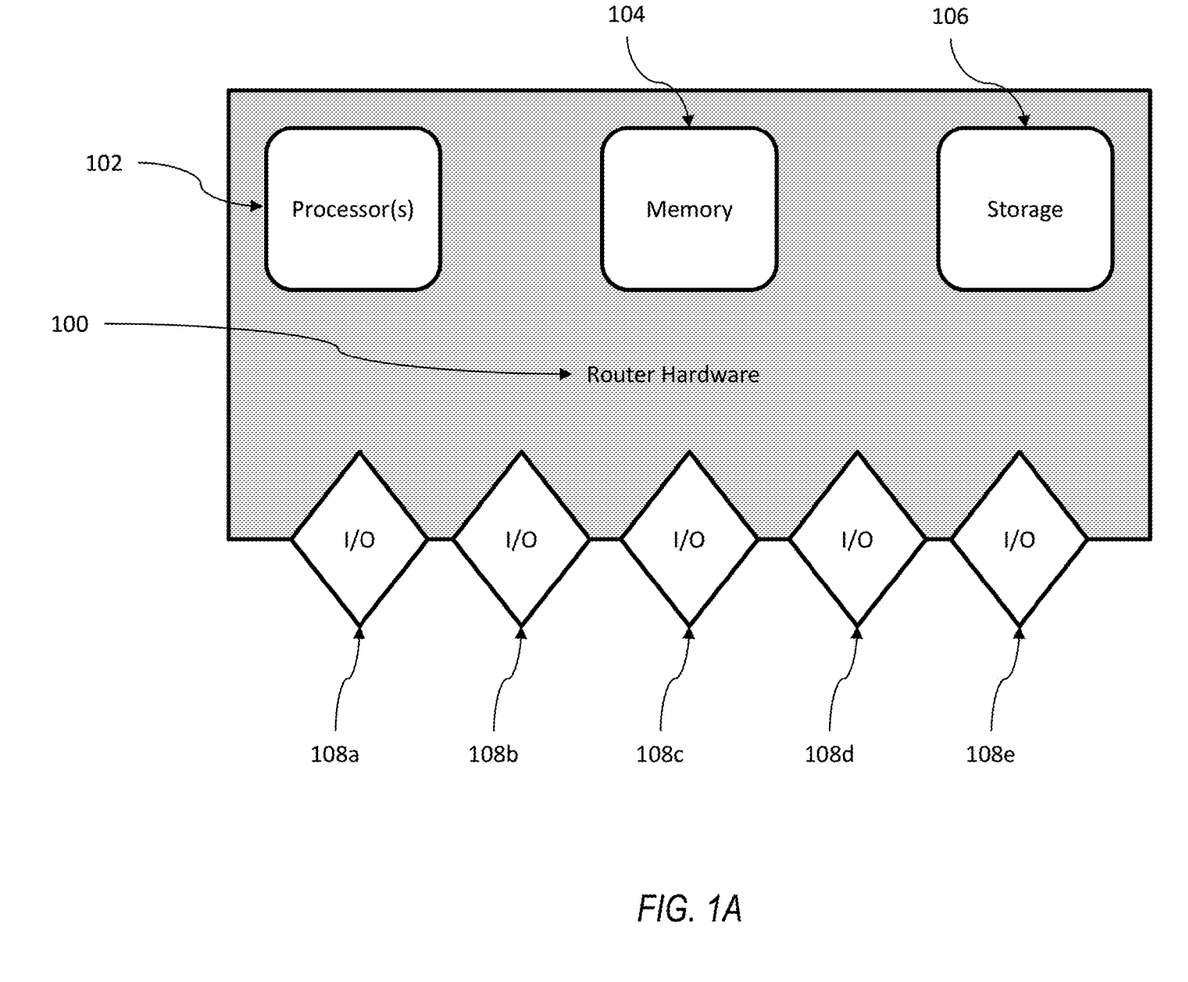
FIG. 1A illustrates an example of a router.

FIG. 1A illustrates an example of router hardware 100. As discussed herein, a router may also be referred to interchangeably as an Information Assurance Specialists (IAS) Router or an IP router. The router 100 may have one or more hardware components such as one or more processors 102 and/or microcontrollers operatively connected to memory 104 and/or storage 106 (e.g., storage mediums, hard drives, solid state drives, ROM, RAM, etc.) and a physical interface. The router may be configured with one or more physical memory and/or storage (hereafter memory/storage 104/106) elements that may or may not be connected. The memory/storage 104/106 may contain computer code that may be executed by the processor and utilize the hardware of the router. The physical interface may have one or more I/O ports 108a, 108b, 018x, 108d, and 108e, such as: a USB port (e.g., USB 1.0, 2.0, 3.0, 3.1, etc.), a serial port (e.g., RS-232), parallel port, Small Computer Systems Interface port (SCSI), FireWire (i.e., IEEE 1394), Thunderbolt (e.g., Thunderbolt 1, 2, 3), Peripheral Component Interconnect (PCI), PCI express (PCIe), Coaxial port, network interface controller (NIC) (e.g., Ethernet RJ-45), modem port (i.e., telephone jack RJ-11/14), wireless card (e.g., WIFI IEEE 802.11 standards, Bluetooth, NFC, cell phone modem based on 3GPP standards, etc.), optical data port (e.g., laser, infrared, etc.), audio ports, display ports (e.g., HDMI, VGA, DisplayPort, etc.), and human interface ports (e.g., keyboard, mouse, PS/2, etc.). Any I/O port that operates a wireless communication technology may also have one or multiple antenna attached. In an example, a networking port may be an Ethernet port. There may be multiple iterations of each type of port, such as a set of networking ports that include at least two Ethernet ports. A set of networking ports may comprise a set of the same type or different types of ports. In one instance not shown, the router may be implemented in another type of device, such as a laptop, a computer, a tablet, a phone, and the like. The router may have user interface hardware, such as a keyboard, mouse, touch screen, monitor, a stylus, a camera, a microphone, and the like. Alternatively, the router may generate a user interface for access by another device, such as any device that might connect to a router such as a laptop, computer, tablet, phone, and the like.

The router may implement directly and/or indirectly various levels of security. The router may be used in a Commercial Solutions for Classified (CSfC) program as instituted by the National Security Agency (NSA). CSfC provides secure solutions leveraging layered encryption solutions to provide adequate protection of classified data.

The router may be used as, in conjunction with, or may assist with: IPsec Virtual Private Network (VPN) Gateway, IPsec VPN Gateway, WLAN Access System, Certificate Authority, IPSec VPN Client, Wireless Local Area Network (WLAN) Client, Session Initiation Protocol (SIP) Server, Mobile Platform, Mobile Device Management (MDM), Software Full Drive Encryption (SWFDE), Hardware Full Drive Encryption, VoIP Applications, Transport Layer Security (TLS) Software Applications; E-mail Clients; Internet Protocol Security (IPS), Traffic Filtering Firewall, Web Browsers, File Encryption, TLS Protected Servers, Session Border Controller, Authentication Server, Medium Access Control Security (MACSEC) Ethernet Encryption Devices, and/or Virtualized Servers.

Figure 1B:
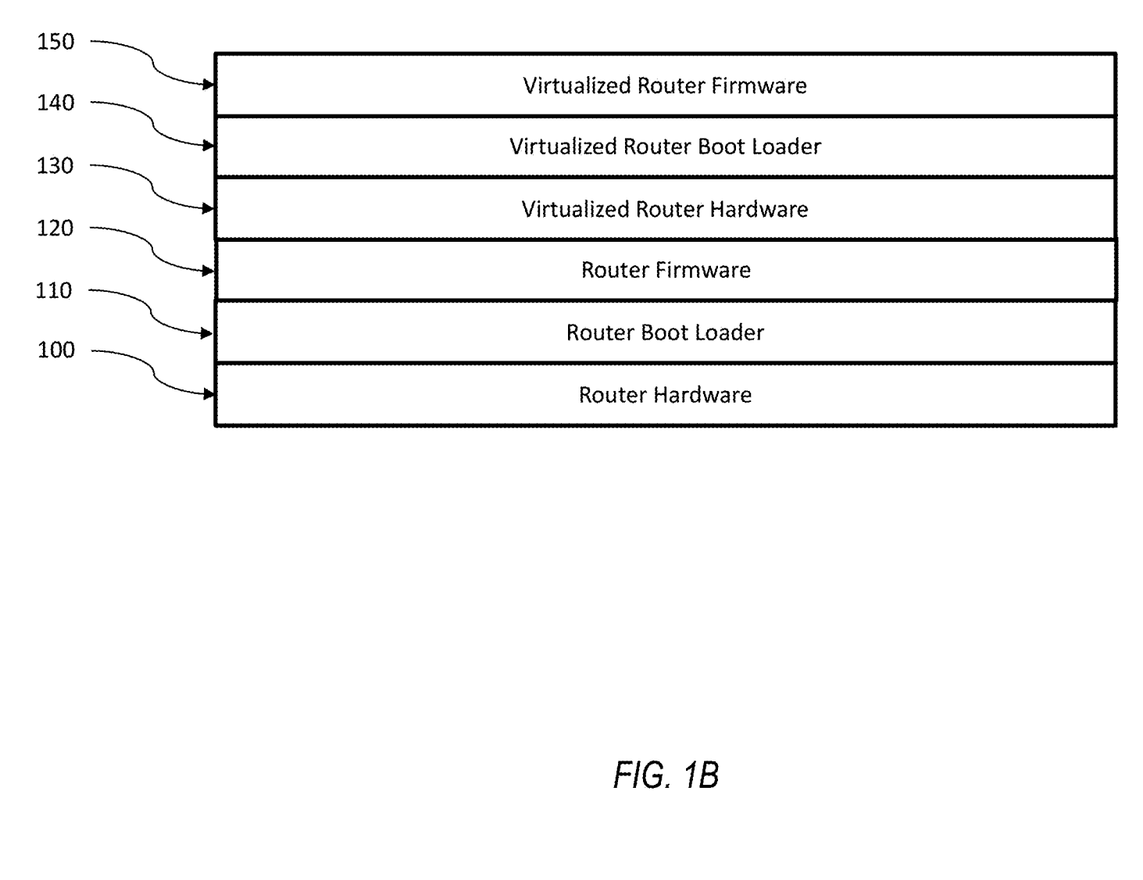
FIG. 1B illustrates an example of a router hardware/software stack.

The router may have a Linux-based operating system (i.e., firmware) capable of performing Internet Protocol (IP) routing, securing traffic using Virtual Private Network (VPN) technology, performing network protection through one or more firewalls, performing intrusion detection, and other software related capabilities. Additionally, there may be a loader for the router that provides a Linux-based pre-boot environment responsible for firmware integrity, router maintenance, and updates. The loader may serve the function as a "boot loader" that relinquishes control to the router operating system once system checks are complete. As discussed herein, "loader" and "boot loader" may be used interchangeably. FIG. 1B illustrates an example of the different layers of a router from hardware to software. The router hardware 100, such as described herein, may run the router loader 110. The router loader may enable the router firmware 120 to run on the router hardware 100. A virtualized router may then run within the router firmware 120. The virtualized router would have all of the same components of a physical router, such as virtualized router hardware 130, virtualized router loader 140, and a virtualized router 150.

The router may incorporate Intel microprocessors with RDRAND instruction, for example. This, along with other hardware-based noise sources, may contribute to Linux blocking, hardware entropy source /dev/random, which may be used for the generation of a keying material for disk encryption. The router may also include command-line (i.e., serial, SSH) configuration, as well as a web-based graphical user interface.

The router may utilize a Trusted Platform Module (TPM) to securely generate and hold a SWFDE key. The router may also utilize Linux kernel features such as initial RAM file system (RAMFS) to securely transfer data between stages of the boot process, to use a hardware-backed entropy source for generation of keying material, and to assist with the integration of SWFDE features.

Figure 2:
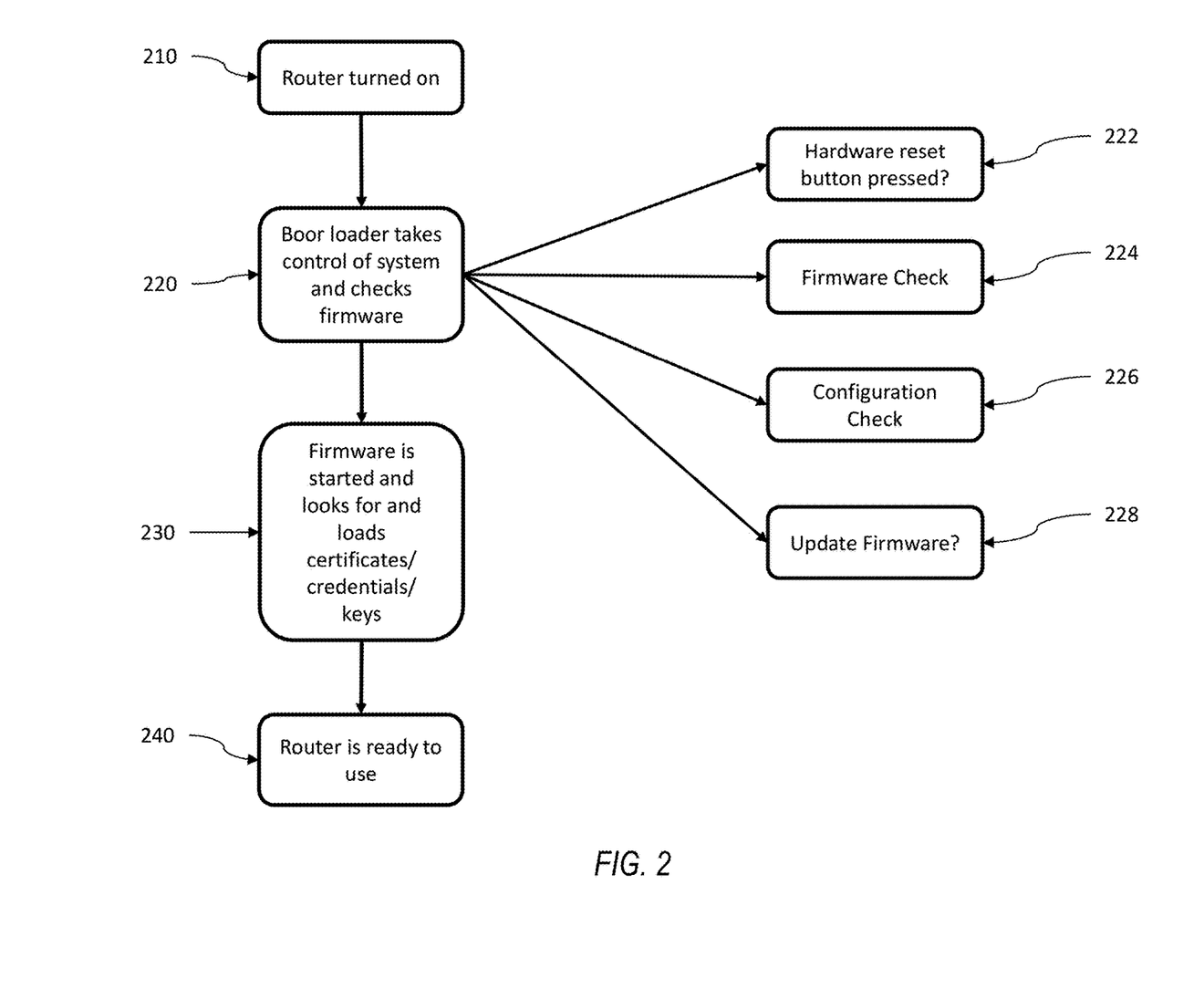
FIG. 2 illustrates an example of a startup process for the operation of a router without layered security.

FIG. 2 illustrates a high-level example of a startup process for the operation of a router without layered security. At 210 the router may be turned on and at 220 a boot loader (e.g., an operating system boot loader such as GRUB (GNU Grand Unified Bootloader)) may check the firmware and other tasks. The boot loader, or a secondary loader, may perform one or more tasks prior to the next step in the startup process, such as determining whether the hardware reset button was pressed 222, checking the firmware 224, checking the configuration 226, and checking for and updating the firmware 228. At 230, once the boot loader loads and runs the firmware, the firmware may then initialize the router for a variety of use cases by accessing and loading certificates/credentials/keys information. At 240, once this information is loaded, the router may be ready to use to create secure connections.

Table 1 illustrates an example of router storage (i.e., firmware) partitioning. The router may consist of a factory-configured firmware layout of four partitions. An encryption mechanism as disclosed herein may interact with these partitions once encryption is setup. The boot loader of a router may contain a compiled Linux kernel and all software components required for operation. This may be packaged into the first partition. Although a factory-shipped configuration may have all partitions included on the storage, the loader may have the capability of referencing the firmware and settings at any location. This may permit the option of moving the other partitions to removable storage (e.g., a USB drive or SD card).

TABLE 1

Example of Router Storage Partition

| Partition | Function |
| --- | --- |
| 1: Boot loader Read-only or Writable | Integrity, reset, upgrades. SWFDE authentication |
| 2: Backup firmware Read-only | Recovery in the case of upgrade failure/corruption |
| 3. Current firmware Read-only | Contains IAS Router binaries |
| 4. Configuration data Writable, in OverlayFS | Contains modifications to default configuration |

In one example, when the boot loader takes control of the router as discussed herein (e.g., step 220), it may first assess if there is a reset signal (e.g., step 222 from the router OS or from a reset button on the router that has been pressed), If there is a reset signal, the router firmware may be rolled back and/or the router may be restored to factory settings, depending on the duration of the button press that caused the reset signal. Next, the current firmware (partition 3) may be checked using a SHA256 message digest signed by an authority of the router, such as IAS, to verify firmware integrity. If the verification fails, the firmware may be rolled back to a known good state (stored on partition 2) and all user data may be cleared. Next, configuration data (partition 4) may be checked for a reset signal (e.g., from the router OS or from a reset switch): if present, the configuration data may be cleared; if not present, then the startup may continue. Next, the configuration data (partition 4) may be checked for a firmware update signal: if present, the loader may search internal and external drives, such as a USB media, for a compatible update, verify it is signed by the proper authority, for example IAS, and then install it to the current firmware (partition 3).

Since credentials were not required at any point during the startup of a non-security-layered router, the router could be subject to unwanted use or access, especially if the credentials/keys are stored unencrypted in the memory/storage. In order to protect the router configuration details, protect stored keys and certificates on the router, prevent inspection of router firmware, and provide protection once power to the router is removed or turned off, one or more embodiments as discussed herein may employ one or more techniques such as, but not limited to, one or more levels of encrypted firmware, one or more levels of encrypted configuration, one or more required layers of authentication, and require no sensitive data stored "in the clear" on non-volatile memory.

Figure 3:
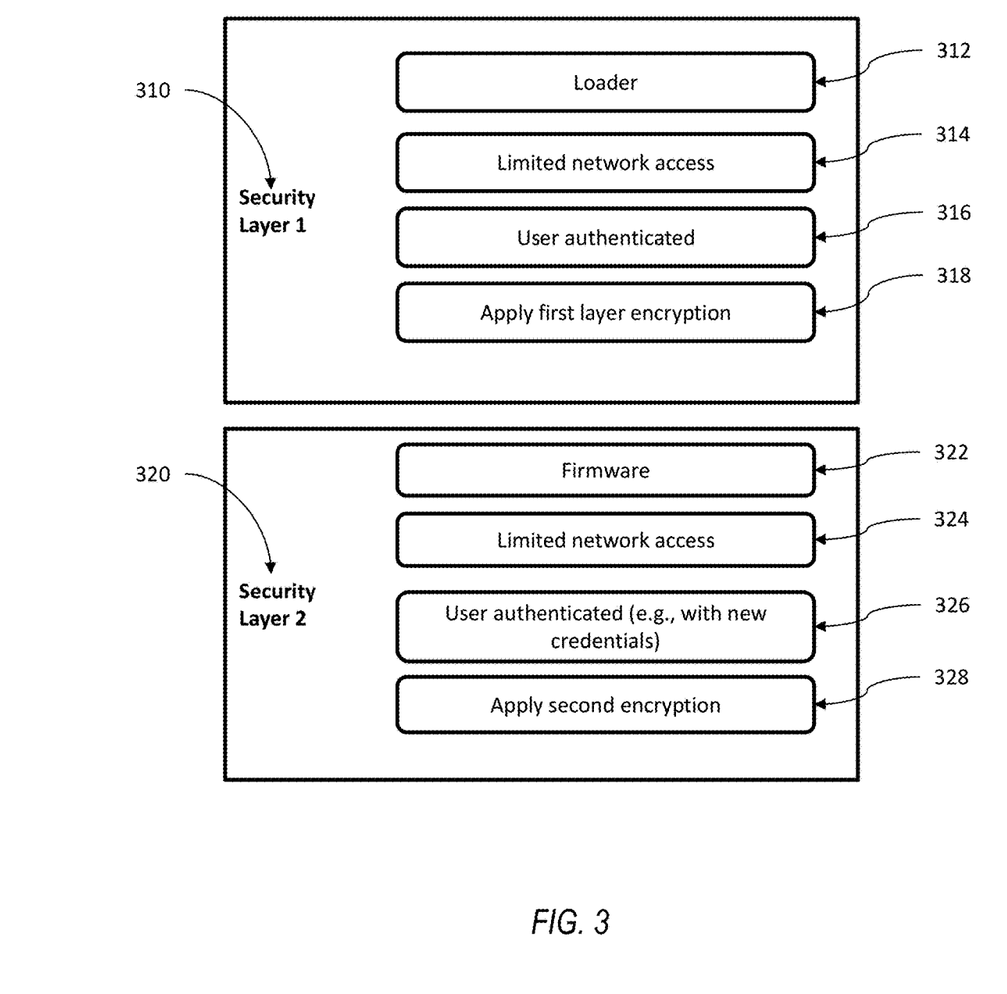
FIG. 3 illustrates an example of an encryption configuration for a router using a two-layered security approach.

FIG. 3 illustrates a high-level example of an encryption configuration for a router using a two-layered approach. In a first layer 310, there may be full-disk encryption to secure the router firmware, protecting operational and technical details of the software from unauthorized disclosure. In a second layer 320, full-disk encryption may be combined with file-based encryption to secure router configuration files representing settings and credentials needed to access a remote classified network. Employing such an approach may utilize a system for user authentication (e.g., 316 and 326) through multiple stages of encryption. While only two layers are shown, the startup process for a router may be broken up or contain additional steps that may be secured with more or less than two layers of security. In one example, the first layer 310 may be based in the loader 312, provide only limited network access 314, and require some form of user authentication 316 in order to enable the first layer encryption 318. Further, the second layer 320 may follow using the firmware 322, may provide limited network access, and may require user authentication 326 with a different set of credentials than those used for the first layer 310 (i.e., 316) in order to enable the second layer encryption 328.

A multi-layered security approach for a router may need to be setup prior to being used in the field. The router may be configured with layered security prior to or at deployment. A network administrator may setup/configure the router. Different credentials may be created (generated and/or user-provided) for each layer of encryption. Initially, once the router is on, the security for the loader may be configured by going through a SWFDE setup process that will add an additional layer of security to the router, which may insert an additional step into an example process, such as the one shown in FIG. 3. The configuration data partition may be checked for the existence of an encryption initialization signal, and if it is found, it may begin a first process of encryption.

During the SWFDE setup process, the loader may configure limited network services that include, for example: one Ethernet port (eth0) configured with a static IP address; a firewall configured to allow only HTTP, HTTPS, and DHCP traffic through; a DHCP server serving addresses in the router subnet; a keying material created for use with the authentication mechanisms; and a web server hosted for user interaction. The loader may then wait for a user to connect to the authentication mechanism.

As discussed herein, a software-based full disk encryption (SWFDE) solution may comprise of any software solution responsible for performing encryption and authentication on an entire storage device or partition thereof. The SWFDE software specification may define expected behavior for components of the system, such as utilization of an operating system kernel for encryption, an algorithm or transform for encrypting and decrypting data, a message digest or hash to verify data integrity, and userspace tools for configuring the solution. Such tools may be used in a router for, but not limited to, encrypted volume creation and mounting. The solution may present a virtual plaintext volume such as a block device in Linux that transparently encrypts data before storing on the underlying physical media. Cryptographic keys may be retained in memory and wiped once the device is closed.

When the router begins the boot process, and the current firmware and user data are unlocked, the loader may begin the process of handing control off to the router firmware (as discussed herein). In one example, this process may comprise generating configuration scripts and keying material that will be passed into the new running kernel; loading the router kernel into memory along with the scripts and keying material; and transferring control of the system to the new kernel.

The construction of the first phase encryption may take into consideration that since the router firmware, including the new kernel, may be secured using disk encryption, the encryption may need to be unlocked to gain access to the router kernel. Also, in executing the new kernel, the state of the disk encryption, along with all plaintext keys, may be lost, requiring re-authentication for the SWFDE layer.

Initially, a web page may be presented to the user presenting a self-signed certificate warning (e.g., with a warning graphic) that a user may experience during the first layer of encryption setup. The user may be presented with a page that, as with other stand-alone web servers utilizing self-signed certificates, the user must first acknowledge if they wish to proceed. Unless otherwise stated, the web page may be presented in a browser and also present an option to go "Back to safety" which may simply be a generic website, such as well-known search web page. The web page may have a link that allows the user to click to proceed. The web page may also have a message describing the initial process and the requirement for authentication. After the certificate has been accepted, a loader credential creation mechanism may be used, such as a web page that requires the entry of credentials for the first layer of security to the router. The web page may have fields to enter a username and password with a radio button to submit the entered credentials for example. The web page may also have a message explaining what the user must do for the credential process. Once valid credentials are provided, the boot process may proceed, and a web page may be presented advising a user that the first layer has been authenticated.

During the process of the first security layer, credentials may be used as keying material for the SWFDE setup process. Intermediate keying material, such as a random keyfile, may be generated and encrypted using user credentials.

A keyfile may be created from the Linux DRBG. This pseudo-random number generator may be seeded using a hardware-backed source before performing any operations. The keyfile may be encrypted using user credentials and stored encrypted on a permanent storage medium.

Figure 4:
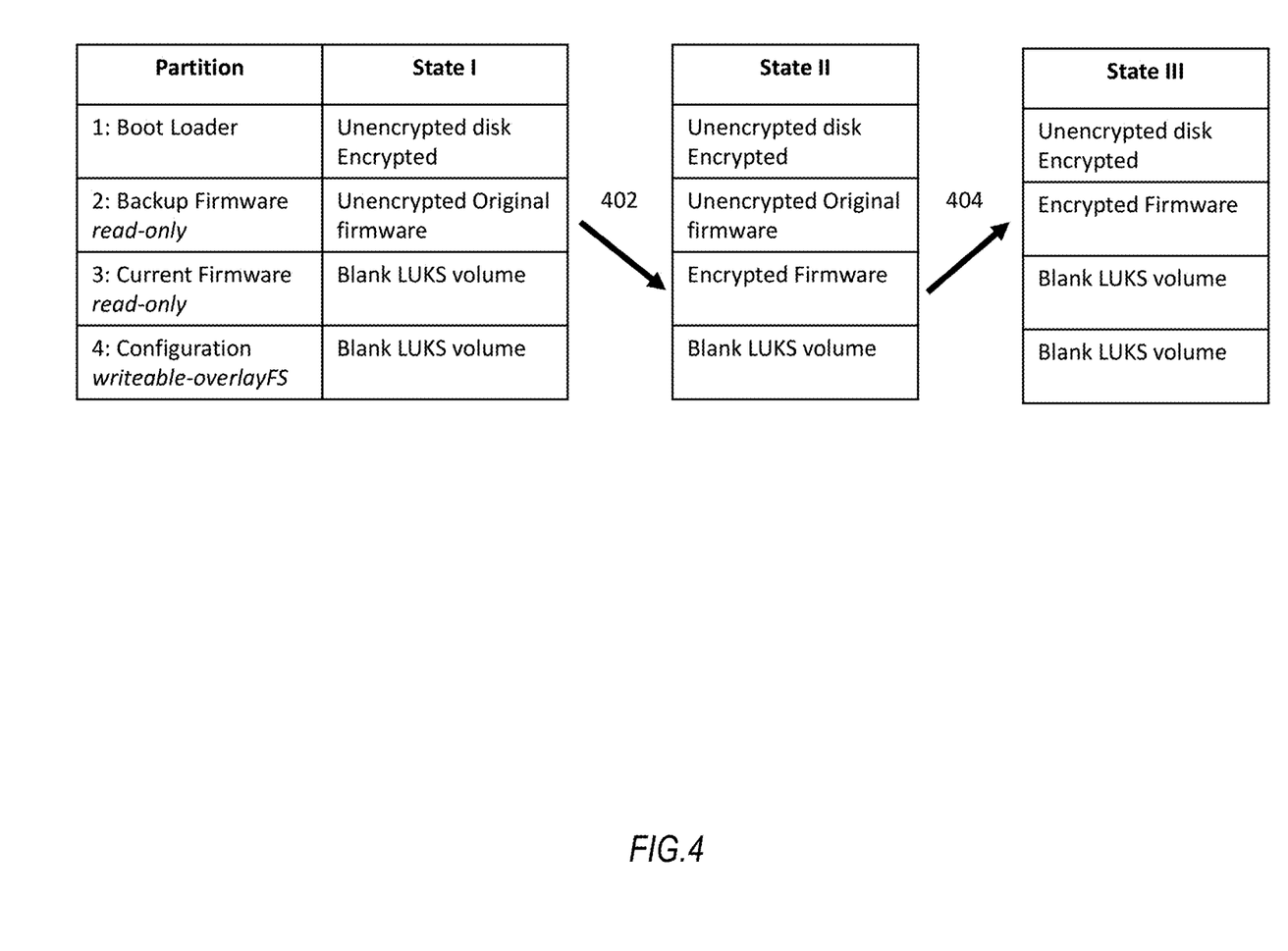
FIG. 4 illustrates an example of the SWFDE setup for a first layer of router encryption as it relates to partition management.

FIG. 4 illustrates an example of the SWFDE setup as it relates to the partitions. SWFDE may be used to encrypt the firmware, using the following order for example: Initially the current firmware (partition 3) may be erased, and SWFDE may be setup and unlocked here; then, the factory firmware (partition 2) may be copied to the SWFDE plaintext device at 402; the SWFDE device may be closed, and the ciphertext may be copied from the current firmware (partition 3) to the factory firmware (partition 2) at 404; Then, the user data (partition 4) may be erased, and SWFDE may be set up and unlocked here; and then, the current firmware (partition 3) may be re-opened.

There may be a web page for applying the second layer of security to a router where the firmware security may be configured. This web page may be similar to some of those shown in the first security layer process in that they may require a user to enter and submit credentials. Once the credentials for the second security layer are completed, there may be a web page that shows the success of applying the second layer of security to a router.

Prior to the File Encryption (FE) setup process, the router may detect early in the boot process that it was started from media containing a SWFDE-encrypted volume. If this is the case, but file-based encryption has not yet been configured, then the file-based encryption initialization procedure may be started. As with the loader, the router may configure limited network services, including for example the following steps: one Ethernet port (eth0) is configured with a static IP address; the firewall is configured to allow only HTTP, HTTPS, and DHCP traffic through; the DHCP server is started, serving addresses in the router subnet; a key and certificate for use with the authentication mechanisms is created (i.e., these temporary certificates are used for first- and second phase web servers in SSL); and/or a web server is started with contents specifically for encryption services.

Once the network services are established, the router may store all configuration parameters in one subdirectory of the user data partition. This means the entire directory may be protected, with an alternate version in place, corresponding to the authentication mechanism settings, available before authentication.

As discussed herein, file-based encryption is a solution which applies encryption and authentication on individual files within a filesystem. This type of encryption may work as a kernel filesystem driver, for example in the Linux operating system. It may operate as a userspace-level driver, such as the FUSE (filesystem in userspace) Linux subsystem, and a filesystem handler may be assigned to mounting a directory of ciphertext files to a blank mount point. Files written to the mountpoint may be encrypted and written to a series of files in the underlying directory. The FE may enact on two directories: first, the mount point, an empty directory, which contains plaintext files protected by the filesystem encryption; and second, separately, a directory on a local or remote filesystem, which contains the ciphertext of the protected file tree. In addition to encryption and authentication, the FE solution may divide the whole data store across multiple directories of equally-sized files to obfuscate individual plaintext file names and sizes.

Before authentication, two directories may be created. One may exist as the ciphertext store, and files placed here by the FE software may reside on the SWFDE-encrypted user data store (partition 4). The other may exist as the plaintext mount point for the FE software, and may contain doubly-encrypted configuration files.

The router may then wait for a user to connect to the authentication mechanism. Once the authentication web page is available, SSL certificate, which may be borrowed from the first phase, the user's web browser may be directed to it. The user may be given the ability to create credentials for file-based (second phase) encryption.

After providing authorized credentials, filesystem encryption may be configured using the FE solution.

Following this, all web and network services may be shut down temporarily. The default configuration files may be duplicated onto the FE plaintext storage directory and may be doubly-encrypted.

At this stage, the encryption may be fully initialized. The user may then be automatically redirected to the IAS Router login page.

Figure 5:
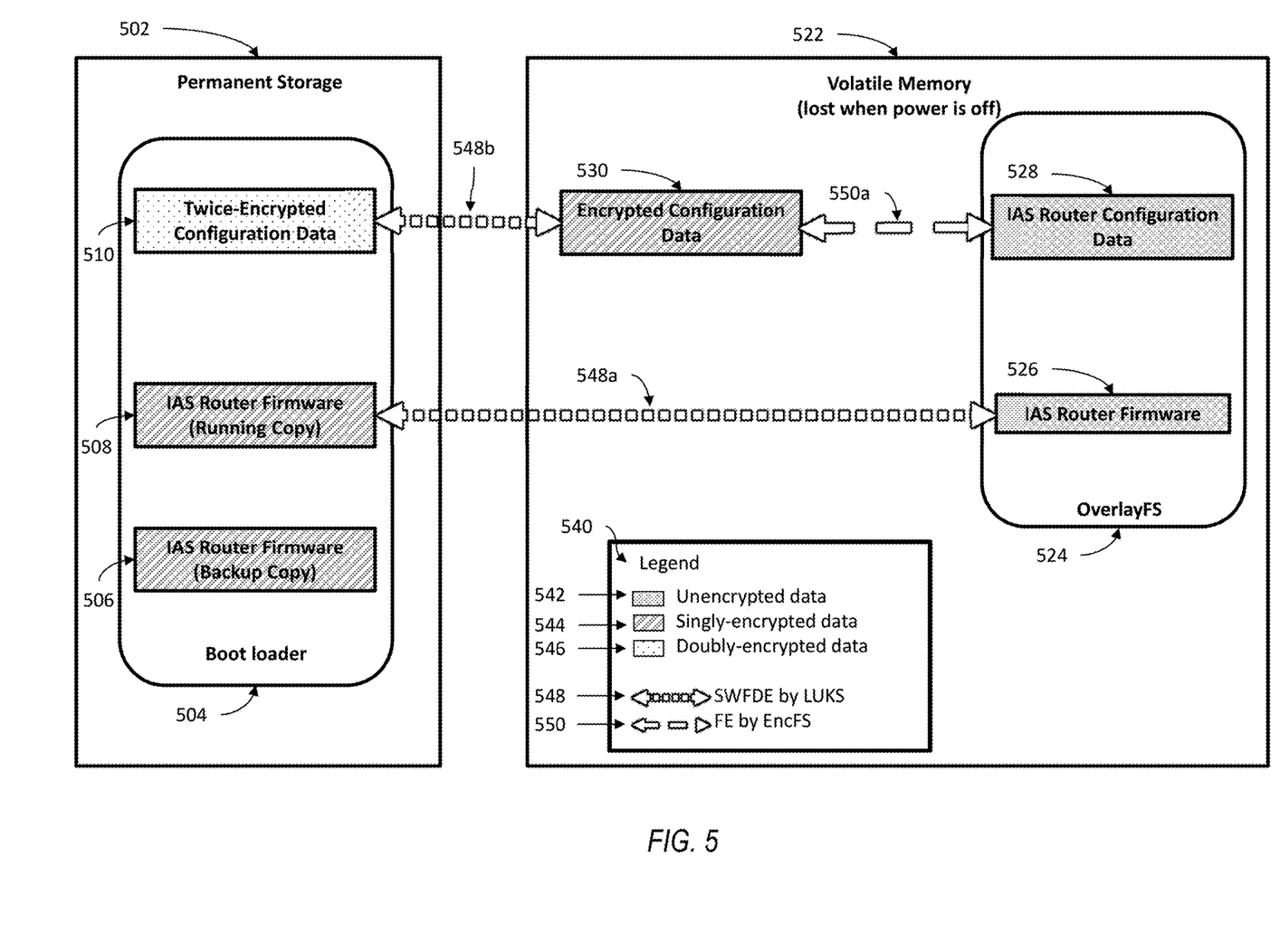
FIG. 5 illustrates an example of the storage and volatile memory process for a router using a two-layered security approach.

FIG. 5 illustrates an example of the state of router storage after the configuration of encryption for a multi-layered security approach. In this example, there is permanent storage 502 and volatile memory 522, which is lost when the power to the device is turned off. In the permanent storage the boot loader 504 is stored which may contain IAS router firmware (backup copy) 506, IAS router firmware (running copy) 508. Note, as can be seen in the legend 540, certain shading indicates certain encryption types, such as dots 546 indicates double-encrypted data, angled stripes 544 indicate single-encrypted data, and cross hatch or grey shading 542 indicates unencrypted data. The legend 540 also shows use/movement of the data as discussed further herein, with arrows, such as SWDFE by LUKS 548, and FE by EncFS 550. For instance, the IAS router firmware (running copy) 508 may be copied to the Overlay File system (FS) 524 of the volatile memory 522 via the SWFDE by LUKS process 548a. The IAS router configuration data 528 may generate encrypted configuration data 530 via FE EncFS 550a. The encrypted configuration data 530 may become the twice-encrypted configuration data 510 at the boot loader 504 via the SWFDE by LUKS process 548b.

At every stage, credentials and unencrypted data may stay in volatile RAM 522 and at power-off or cold-start the firmware 508/506 and configuration 504 may be encrypted, as shown in FIG. 5. Once the router is powered off, all cryptographic keys and router settings stored in volatile RAM 522 may be destroyed. At any stage as further described herein, the router firmware may receive a signal from a physical or software source that causes the router to overwrite the SWFDE keyfile; this may be used as a zeroize or tamper switch.

Table 2 presents an example of the overall process of using a two layers encryption approach with a router.

TABLE 2

Example of Two-Layer Security Router Start-Up Process

| Stage | User Experience | Router Activity | Router Activity - Technical | Non-Volatile State |
|---|---|---|---|---|
| 1 | User applies power to IAS Router/user presses power button to turn the router on. | In a factory condition, IAS Router Boot Loader firmware loads and runs. The boot loader checks the integrity of the firmware image and restores a factory-shipped firmware if needed. | Partition 1 = IAS Router Boot Loader Firmware. This is a GRUB image and ramdisk with critical functions. After integrity verification, the running firmware on partition 3 (initially, a copy of partition 2) is loaded and execution passed to it. | P1: Unencrypted boot loader; P2: Unencrypted factory-shipped firmware; P3: Unencrypted running firmware; P4: Unencrypted user data. |
| 2 | | IAS Router starts after boot loader has relinquished control. | During IAS Router booting, the user data (partition 4) is mounted as an overlay filesystem. Changes to files (such | |

TABLE 2-continued

Example of Two-Layer Security Router Start-Up Process

| Stage | User Experience | Router Activity | Router Activity - Technical | Non-Volatile State |
|---|---|---|---|---|
| 3 | User logs into IAS Router and changes Validated Mode of Operation to CSfC with DAR. A warning is displayed that this process is irreversible and will erase all current user configuration. | Router begins the configuration process. | as configuration) are written to this partition. Partitions 2 and 3 are read-only. A signal file is placed in the user data partition to indicate to the boot loader that the DAR process should be initiated. The router is rebooted. | |
| 4 | | IAS Router Boot Loader firmware loads and runs. The Boot Loader provides minimal network services and starts a webserver so that a computer connected to a LAN interface can obtain an IP address and navigate to a Boot Loader authentication screen that is provided by a webserver as part of the IAS Router Boot Loader firmware. | Partition 1 = IAS Router Boot Loader Firmware After powering on, the router will start by booting into the IAS Loader. The router assigns a /30 IP address to ETH1 and starts dhcpd and uHTTPd for DHCP and web services. The connection is secured with SSL (self-signed certificates) and AES-256-GCM encryption. | |
| 5 | User navigates to IAS Router Boot Loader webpage on their PC that is connected to a designated LAN Ethernet interface, and then enters NEW user credentials. | After providing desired authentication values, partitions are encrypted and the boot loader continues. | A 256-bit keyfile is generated from a hardware random number generator, and stored in volatile memory (RAM). The keyfile is then encrypted using GNU privacy guard (GPG) with symmetric AES256 encryption, and the encrypted keyfile is added to the first partition. The unencrypted keyfile is used to create a LUKS whole-disk encrypted volume on the third and fourth partitions. | P1: Unencrypted boot loader; P2: Unencrypted factory-shipped firmware; P3: Blank encrypted disk; P4: Blank encrypted disk. |
| 6 | | | The factory-shipped firmware on partition 2 is copied to the encrypted storage. | P1: Unencrypted boot loader; P2: Unencrypted factory-shipped firmware; P3: Encrypted IAS Router firmware; P4: Blank encrypted disk. |
| 7 | | | The encrypted IAS Router firmware on partition 3 is copied to the backup partition 2. | P1: Unencrypted boot loader; P2: Encrypted backup firmware; P3: Encrypted IAS Router firmware; P4: Blank encrypted disk. |
| 8 | Web page indicates success. Network services go down for a short period. | Boot loader starts the current firmware image. | Boot loader creates custom initial RAM filesystem (initramfs) CPIO archive in volatile memory, with the minimum essential files including LUKS disk encryption tools, the | |

TABLE 2-continued

Example of Two-Layer Security Router Start-Up Process

| Stage | User Experience | Router Activity | Router Activity - Technical | Non-Volatile State |
|---|---|---|---|---|
| 9 | | | decrypted keyfile, and a pre-boot script to re-mount the encrypted partitions before starting the router. The current firmware's kernel is loaded into memory and the initramfs associated with it, and then the system hands execution over to the new kernel. All disks are unmounted, encrypted disks locked, and network services terminated at this time. The router kernel boots into a minimal environment. The decrypted keyfile (stored in RAM) is used to decrypt and mount the root filesystem with IAS Router binaries. The user overlay (partition 4) is also decrypted so it may be mounted later in the boot process. | |
| 10 | Network services come up, and user is taken to a new web page for second phase authentication. | The router continues booting IAS Router from the current running partition, and will then make itself accessible by webpage, which the user is automatically directed to. The router will wait for proper credentials to be provided, at which point it will decrypt the overlay image file and reload IAS Router with the user's configuration and network settings. | The router boots with a default configuration tailored to second-stage authentication. Specific configuration files suited for this authentication mode are installed in an overlay ramdisk, and services not essential to authentication are held back. Network, DHCP, and web services are started. | |
| 11 | User enters their NEW user credentials. | The router detects a blank encrypted disk in the user partition (4). A web page is presented to create second phase authentication. | Once credentials are created, an ext4 filesystem is created in the LUKS drive corresponding to partition 4. Then, an EncFS volume is created with ciphertext files stored on the LUKSp4. The ciphertext folder used resides on the LUKS-decrypted user data partition 4. The EncFS plaintext directory becomes an upper in an overlay filesystem, where configuration settings are stored. | P1: Unencrypted boot loader; P2: Encrypted backup firmware P3: Encrypted IAS Router firmware; P4: Encrypted user disk containing EncFS encrypted files; P4 (EncFS plain) contains doubly-encrypted configuration files. |

TABLE 2-continued

Example of Two-Layer Security Router Start-Up Process

| Stage | User Experience | Router Activity | Router Activity - Technical | Non-Volatile State |
|---|---|---|---|---|
| 12 | IAS Router is now ready for use, and full network services are brought up, certificates are made available, and VPN Tunnels establish (if configured to auto initiate). The IAS Router is now fully operational. | Full IAS Router functionality is available, in the event of a power loss or power cycle User Configuration data that is located in volatile memory is no longer accessible, and IAS Router Firmware is inaccessible. | | |

Figure 6:
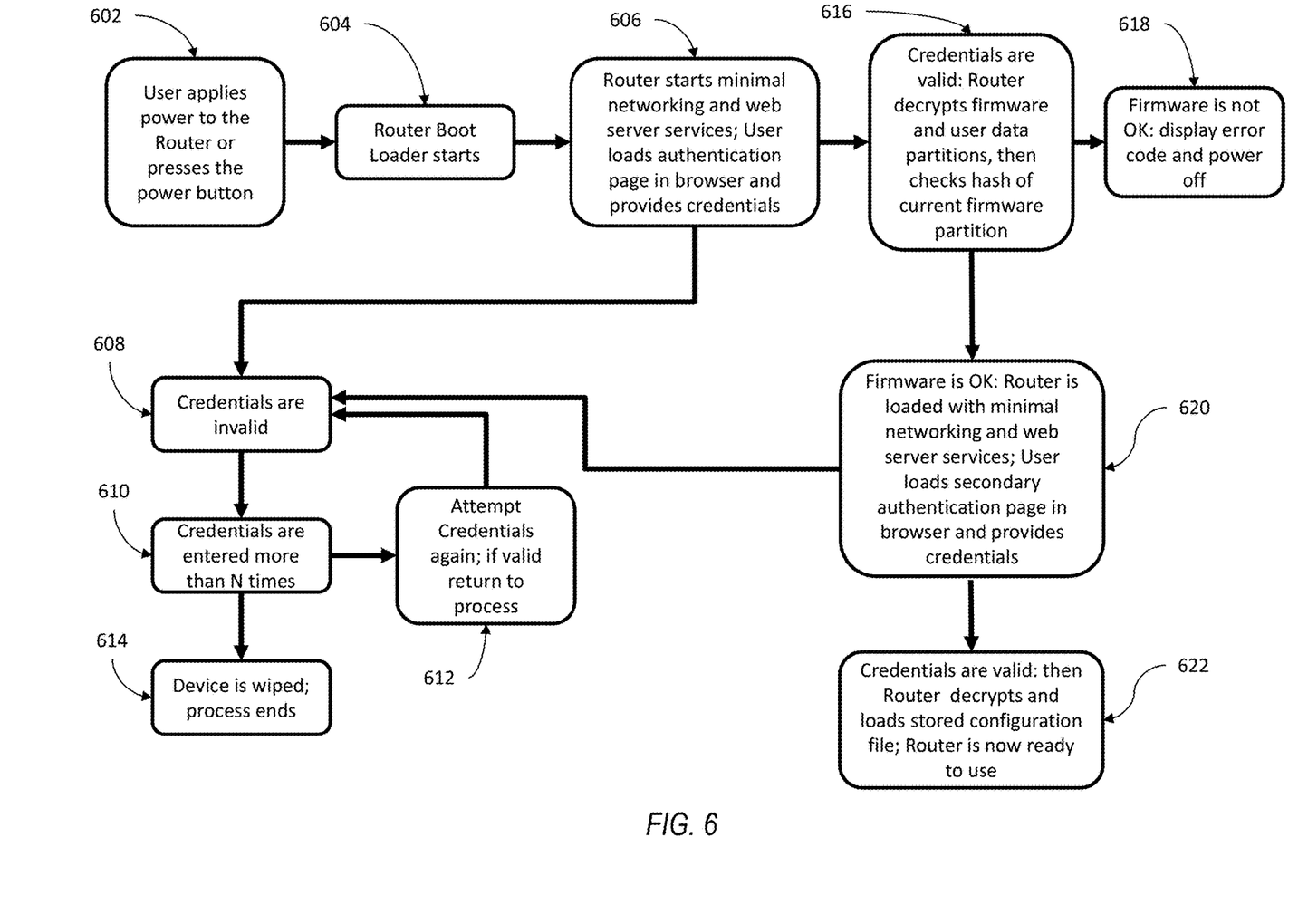
FIG. 6 illustrates an example of a two-layered security process.

FIG. 6 illustrates an example of a startup process for the operation of a router with layered security configured. At 602, upon applying power or turning on the router, the loader may start up at 604 and begin a first-layer authentication through a designated Ethernet port (e.g., DHCP server on a /30 subnet/web server with SSL) at 606. Credentials may be provided by a user, where the passphrase provided is tested by attempting to decrypt the SWFDE medium. At 608, if the credentials are invalid, an "incorrect credentials" message may be provided to the user and the user may try again at 612. However, after a certain number of failed attempts at 610 the keyfile may be destroyed, the router may be wiped, and the startup process fails at 614. At 616, if the credentials are valid, then the first-layer authentication has been successful and the router may decrypt the firmware and user data partition and verify the digital signature of the current firmware partition. At 618, if the current firmware partition check is bad or not OK, then an error is displayed and the router is shutdown. At 620, if the current firmware partition check is good or OK, the router may be loaded with a limited set of networking/web server services (e.g., DHCP server on a /30 subnet and web server with same SSL certificate). The user may then load the second-layer authentication by accessing a page in a limited browser, or other interface application, and provide credentials. For the second layer authentication process, the credentials may go through the same process if the credentials are invalid 608 (see also 610, 612, and 613), where if the credentials are invalid the user may try again, but after a certain number of failed attempts the keyfile may be destroyed, the router may be wiped, and the startup process fails. At 622, if the credentials are valid, the router may decrypt and load one or more stored configuration files and the router may be ready to use or may continue to startup any remaining elements necessary for router operation. In one instance, to ensure every security precaution is taken the credentials for the second-layer may be different than the first-layer authentication.

Throughout any of the example processes described herein, there may be web page presented to the user through a browser of a graphic user interface or either the router itself or a device connected to the router. For example, after the encrypted boot process, as discussed herein, the loader may start up basic network services once a SWFDE volume is detected. The user may then be presented with a login page. Once the credentials of the first layer are accepted, the user may be presented with a success page while the router boots to the firmware/OS. Then another page may be presented to login for the second layer of encryption. In some instances, in either the first phase or second phase, a user may be presented a page if the authentication fails. If too many login attempts fail, the user may be presented with a page that advises that no more login attempts are possible and that the router has been wiped. After a successful login for the second layer of encryption the user may be presented with a success page while the router boots to a full access/function mode. Once the router is fully operational and the two layers of encryption have been successfully employed, the user may be presented with a page that presents the operational parameters, status, and functions of the router. For example, the user may employ a VPN, firewall, wireless communication, and the like as described herein. The user may also initiate a logout from this page.

In one embodiment, the first layer of security may provide limited network services and an SSL-capable web server for user interaction with the first phase (software-based full disk encryption) of authentication. Also, the second layer of security may provide restrictive router configuration including SSL-capable web server for user interaction with the second phase (software-based file encryption) of authentication, and a file-based encryption with RAM-based volatile storage as a plaintext substrate for configuration files.

At any point in the initialization of the router and/or in the operation of the router, further authentication may be required which is prompted by one or more triggers, such as an event related to the router (e.g., connection lost, timeout, or change), an interaction with the router (e.g., connecting or disconnecting anything to the router hardware), a timer, a particular time, randomly, or the like. The authentication may be the same or different as the authentications that have already occurred.

In any of the embodiments or examples discussed herein, credentials and/or authentication means may require a user identification combined with a password, a two-factor authentication setup, a security token, a physical key, a digital key (e.g., stored on a USB drive), biometric, and/or any combination thereof.

What is claimed is:

1. A router comprising:
    a processor;
    a memory;
    a storage;
    a plurality of network interfaces, wherein the processor, memory, storage, and plurality of network interfaces are operatively connected to each other;
    the processor, memory, storage, and plurality of network interfaces are configured to run a boot loader that establishes limited network access through a first network interface of the plurality of network interfaces and receive first credentials from a user device connected through the first network interface, wherein the first network interface provides a direct connection to the user device;

the processor, memory, storage, and plurality of network interfaces are further configured to validate the first credentials and unlock the storage based on the first credentials, check firmware in the unlocked storage, run the firmware, and receive second credentials from the user device connected through the first network interface, wherein the firmware is preloaded onto the storage;

the processor, memory, storage, and plurality of network interfaces are further configured to validate the second credentials and unlock settings files based on the second credentials and initiate secure operation of the router based on the unlocked settings files, wherein the setting files are stored on the router; and the processor, memory, storage, and plurality of network interfaces are further configured to enable secure access to an external network to the user device based on the initiation of the secure operation of the router.

2. The router of claim 1, wherein the user device is a computer or a laptop, and the first credentials are received at the computer or laptop from a card reader, a USB port, a camera, or a finger print reader.

3. The router of claim 1, wherein the storage is encrypted prior to establishing limited network access.

4. The router of claim 1, wherein the boot loader further establishes an SSL web server.

5. A method performed by a router comprising:
running a boot loader that establishes limited network access through a first network interface of a plurality of network interfaces, wherein the first network interface provides a direct connection to a user device;

receiving first credentials from the user device connected through the first network interface;

validating the first credentials and unlocking a storage based on the first credentials, wherein the storage is on the router;

checking firmware in the unlocked storage, wherein the firmware is preloaded onto the storage;

running the firmware;

based on running the firmware, receiving second credentials from the user device connected through the first network interface;

validating the second credentials;

unlocking settings files based on the validated second credentials, wherein the setting files are stored on the router;

initiating a secure operation of the router based on the unlocked settings files; and enabling secure access to an external network to the user device based on the initiation of the secure operation of the router.

6. The method of claim 5, wherein the user device is a computer or a laptop, wherein the first credentials are received at the computer or laptop from a card reader, a USB port, a camera, or a finger print reader.

7. The method of claim 5, wherein the storage is encrypted prior to establishing limited network access.

8. The method of claim 5, wherein the boot loader further establishes an SSL web server.

9. The router of claim 1, wherein the router does not have any connection with an external network prior to the initiation of the secure operation of the router.

10. The method of claim 5, wherein the router does not have any connection with an external network prior to the initiation of the secure operation of the router.

* * * * *